United States Patent [19]

Kirschbaum

[11] Patent Number: 4,473,788

[45] Date of Patent: Sep. 25, 1984

[54] SINGLE PHASE TWO POLE/SIX POLE MOTOR

[75] Inventor: Herbert S. Kirschbaum, Asheville, N.C.

[73] Assignee: Westinghouse Electric Corp., Pittsburgh, Pa.

[21] Appl. No.: 483,982

[22] Filed: Apr. 11, 1983

[51] Int. Cl.³ .............................................. H02P 7/48
[52] U.S. Cl. ..................................... 318/776; 310/180
[58] Field of Search ............... 318/772, 773, 774, 776; 310/180, 181, 182, 183, 184, 198–208

[56] References Cited

U.S. PATENT DOCUMENTS

| 771,246 | 10/1904 | Henshaw | 310/202 |
|---|---|---|---|
| 1,859,368 | 5/1932 | Kennedy | 318/776 |
| 1,859,369 | 5/1932 | Kennedy | 318/776 |
| 2,820,938 | 1/1958 | Davies | 318/773 |
| 3,233,160 | 2/1966 | Rawcliffe | 318/776 |
| 3,295,034 | 12/1966 | Herzog | 310/184 |
| 3,619,730 | 11/1971 | Broadway | 318/776 |

Primary Examiner—Ulysses Weldon
Assistant Examiner—Bentsu Ro
Attorney, Agent, or Firm—R. P. Lenart

[57] ABSTRACT

A single phase alternating current two pole/six pole motor is provided with a main stator winding having six coils disposed unequally around the periphery of the machine. These coils are divided into two groups. When these groups are connected such that their magnetomotive forces are additive, two pole motor operation results. When the polarity of one of the groups is then reversed, six pole motor operation results. An auxiliary stator winding which is similar to the main stator winding is displaced from the main stator winding by 90 electrical degrees on a two pole basis.

14 Claims, 12 Drawing Figures

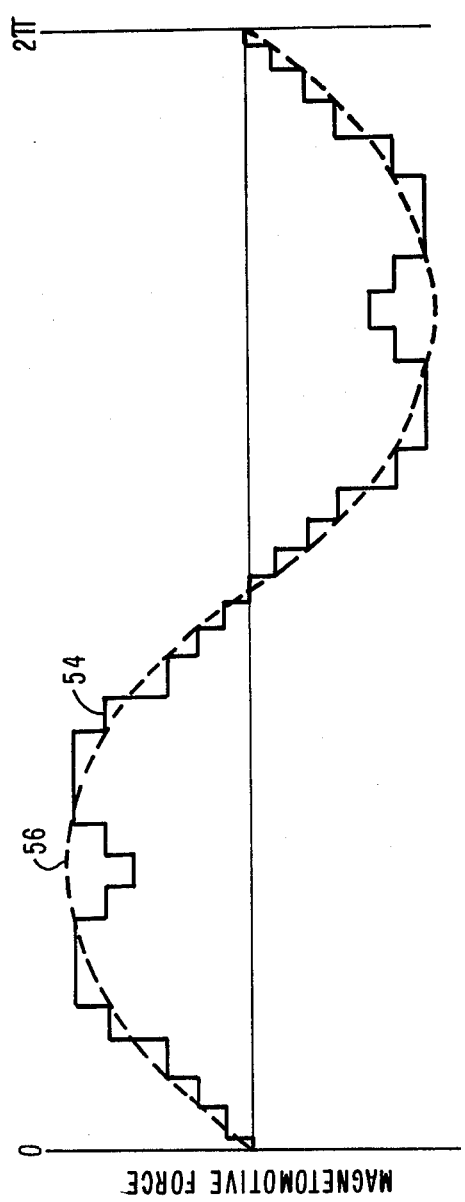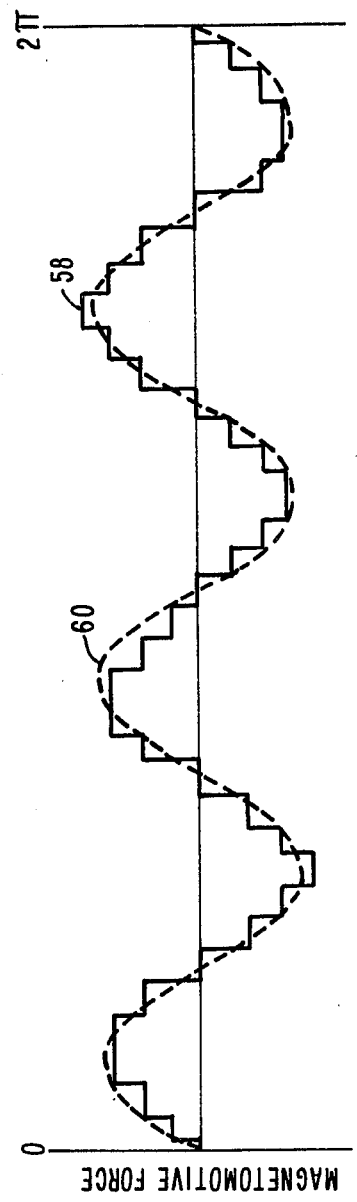

SINGLE PHASE TWO POLE/SIX POLE MOTOR

STATEMENT OF GOVERNMENT INTEREST

The U.S. Government has rights in this invention pursuant to Prime Contract No. W-7405-ENG-26 and Subcontract No. 86X-24712-C awarded by the U.S. Department of Energy.

BACKGROUND OF THE INVENTION

This invention relates to pole changing, single phase alternating current rotary electric machines, and more particularly to induction motors having stator windings which are capable of alternatively being connected for two pole and six pole operation.

High efficiency heat pumps require high efficiency compressor motors having multi-speed capabilities. Conventional multi-speed motors employ an extra winding that effectively reduces the operating flux level which is equivalent to voltage reduction in a poly-phase motor. The resulting speed torque curve of the motor is reduced and the motor operates at reduced speed determined by the intersection of the load speed torque characteristic with the motor speed torque characteristic. In order to get significant speed reduction, the motor then operates at a high value of slip which leads to very poor efficiency. Since a compressor motor of a high capacity heat pump may operate at low speed for 75% of the pump's operating hours, the use of a two speed compressor motor based on high slippage at the low speed is unacceptable.

Pole changing alternating current electric motors have been developed to provide multi-speed operation without high slippage values. For example, U.S. Pat. No. 3,233,160 issued Feb. 1, 1966 to Rawcliffe, discloses a single phase alternating current pole changing motor having a stator winding arrangement which includes two windings for connection together to a single phase alternating current supply to provide a running field for the motor wherein each winding is wound for a first pole number and has winding parts arranged for alternative connection in the circuit according to a method of pole amplitude modulation, thereby providing second and third pole numbers together in each winding considered independently. An additional stator winding is provided for connection to the single phase alternating current supply through a phase shifting means, to provide a starting field for the motor. The first two windings are physically disposed for elimination of the third pole number from the running field.

U.S. Pat. No. 3,619,730 issued Nov. 9, 1971 to Broadway et al., discloses a four pole/six pole machine which utilizes a pole amplitude modulation technique. The Broadway et al. patent employs four stator field coils in the main winding and favors a four pole field. In addition, Broadway et al. shows only a four pole (consequent pole) auxiliary winding, which would be used only in the four pole connection and would be disconnected when running as a six pole machine. Therefore, the machine could be started only in the four pole mode. The present invention utilizes six field coils in the main stator winding of a two pole/six pole single phase motor, and can be started when connected for either pole number.

SUMMARY OF THE INVENTION

A single phase alternating current two pole/six pole electric motor constructed in accordance with this invention comprises: a pair of line terminals for connection to an external single phase alternating current power source; a first main stator winding coil group connected between the line terminals and including four coils equally spaced around the periphery of the machine and connected such that two adjoining coils of the four coils produce magnetomotive force of one polarity while the other two coils produce magnetomotive force of the opposite polarity; a second main stator winding coil group including two coils spaced 180 mechanical degrees apart wherein one of these coils is centered between each pair of coils in the first main stator winding coil group which produce flux of the same polarity; means for connecting the second main stator winding coil group between the line terminals such that the magnetomotive force produced by each coil of that group is of the same polarity as that of the adjacent pair of coils of the first main stator winding coil group, for two pole motor operation; and means for connecting the second main stator winding coil group between the line terminals such that the magnetomotive force produced by each coil in the second main stator winding coil group is of the opposite polarity as that of the adjacent pair of coils of the first main stator winding coil group, for six pole operation.

For constant torque motor operation, the six main stator winding coils can be arranged into two coil groups each including two coils of a first type and one coil of a second type connected in series. In this case, coils of the first type correspond to the four equally spaced coils mentioned above, while coils of the second type correspond to the two coils which are spaced 180 mechanical degrees apart. With this arrangement, six pole operation can be achieved by connecting the two coil groups in series and two pole operation can be achieved by connecting the two coil groups in parallel and also reversing the polarity of the coils of the second type in each group. Alternative series/parallel configurations can also be used.

BRIEF DESCRIPTION OF THE DRAWING

FIG. 6 is a waveform of the magnetomotive force produced by the winding of FIG. 4;

FIG. 9 is a waveform of the magnetomotive force produced by the winding of FIG. 7;

DESCRIPTION OF THE PREFERRED EMBODIMENT

Figure 1:
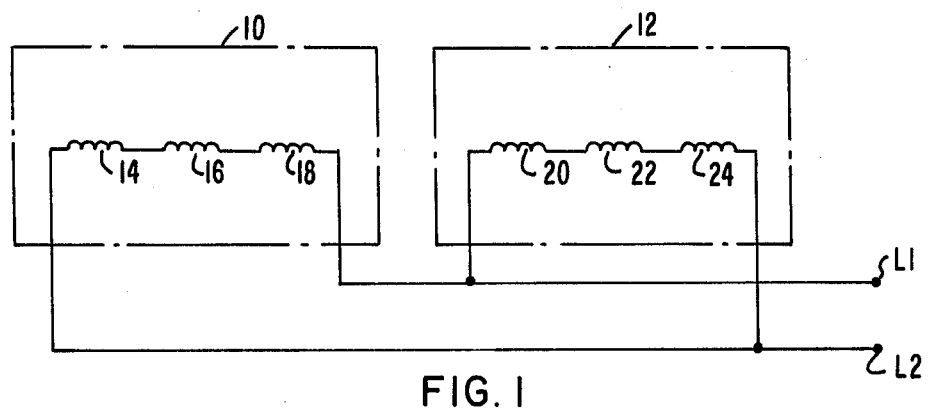
FIG. 1 is a schematic diagram of a stator winding circuit of a motor constructed in accordance with one embodiment of this invention, connected for two pole operation.
Figure 2:
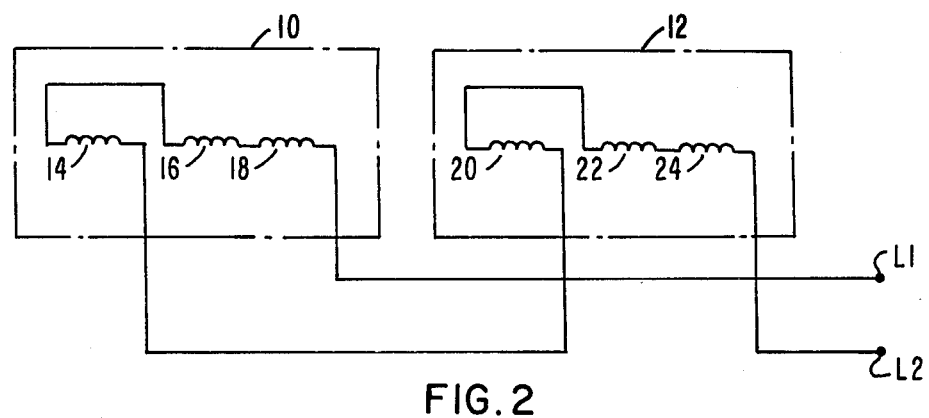
FIG. 2 is a schematic diagram of the stator winding of FIG. 1 connected for six pole operation.

Referring to the drawings, FIG. 1 is a schematic diagram of a main stator winding in a single phase alternating current electric motor constructed in accordance with the present invention. This winding comprises two coil groups 10 and 12 each having three coils connected in series. Coil group 10 includes the series connection of coils 14, 16 and 18, while coil group 12 includes the series connection of coils 20, 22 and 24. A pair of line terminals L1 and L2 are provided for connection to an external power source and coil groups 10 and 12 are connected in parallel between these terminals for two pole motor operation. FIG. 2 is a schematic diagram of the same main stator winding with coil groups 10 and 12 being connected in series between line terminals L1 and L2 for six pole motor operation. In this configuration, the polarity of one coil in each coil group has been reversed with respect to its polarity for two pole operation. The reversed polarity coils are designated as 14 and 20 in FIG. 2.

Figure 3:
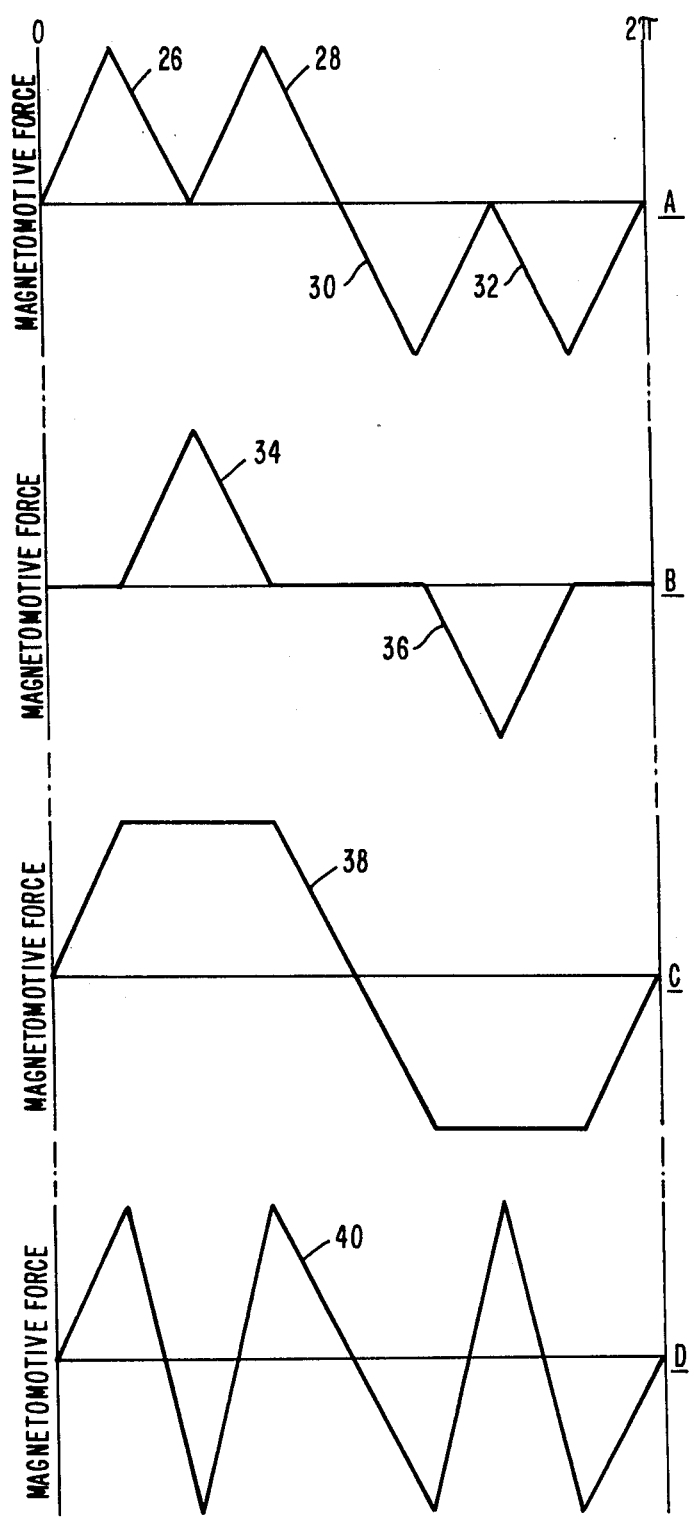
FIG. 3 is a series of waveforms representing the magnetomotive force produced by the coils of FIGS. 1 and 2.

FIG. 3 is a series of waveforms illustrating idealized magnetomotive force distributions produced by the winding of FIGS. 1 and 2. Waveform A of FIG. 3 illustrates the magnetomotive force produced by a first coil type and waveform B of FIG. 3 illustrates the magnetomotive force produced by a second coil type. In a motor constructed in accordance with this invention, four coils of the first coil type are equally spaced around the motor periphery and two coils of the second coil type are spaced 180 mechanical degrees apart and centered between a pair of coils of the first coil type. In waveforms A and B of FIG. 3, magnetomotive force distributions 26, 28, 30 and 32 correspond to coils 16, 18, 22 and 24 of FIG. 1 respectively and magnetomotive force distributions 34 and 36 correspond to coils 14 and 20 of FIG. 1 respectively. Waveform C of FIG. 3 shows the two pole field created when the two coil types are connected in such a way as to result in the addition of their magnetomotive forces. Waveform D of FIG. 3 shows the six pole magnetic field resulting if the coil types are connected in such a way as to cause the magnetomotive force of the second coil type to subtract from that of the first coil type.

Figure 4:
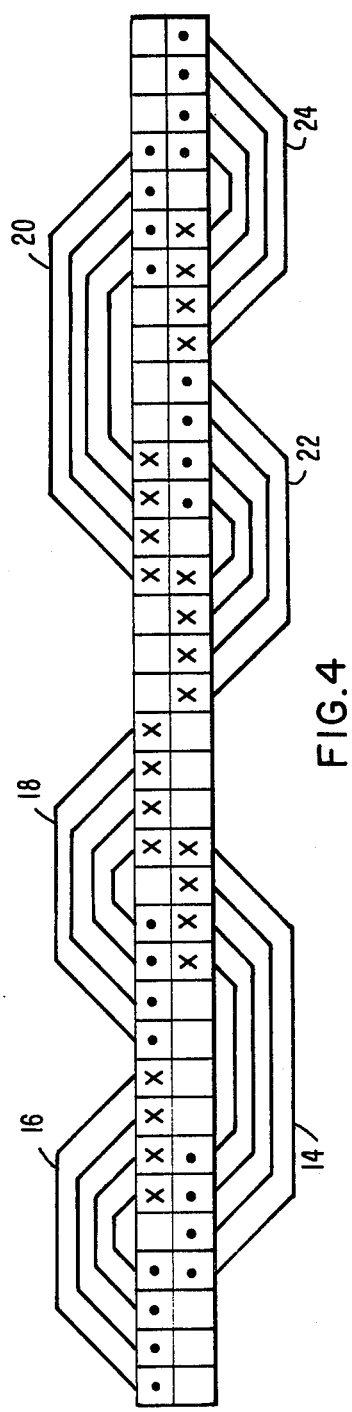
FIG. 4 is a main stator winding wiring diagram showing the slot loading of a 36 slot stator connected in accordance with the schematic diagram of FIG. 1.

FIG. 4 is a wiring diagram of the main stator winding for a 36 slot stator connected in accordance with the circuit of FIG. 1 wherein the dots represent instantaneous current flow out of the sheet and the x's represent instantaneous current flow into the sheet. In this diagram, coils of the first type, 16, 18, 22 and 24, are seen to be equally distributed around the periphery of the motor and coils of the second type, 14 and 20, are seen to be spaced 180 mechanical degrees apart with each being centered between a pair of coils of the first type. In addition, coils of the second type are shown to extend beyond the center line of the adjacent pair of coils of the first type to improve the resulting total magnetic field distribution. Therefore, coils of the second type have a span which is greater than twice the span of coils of the first type. For example, if coils of the first type each span 25% of the machine periphery, then coils of the second type will generally span more than 25%.

Figure 5:
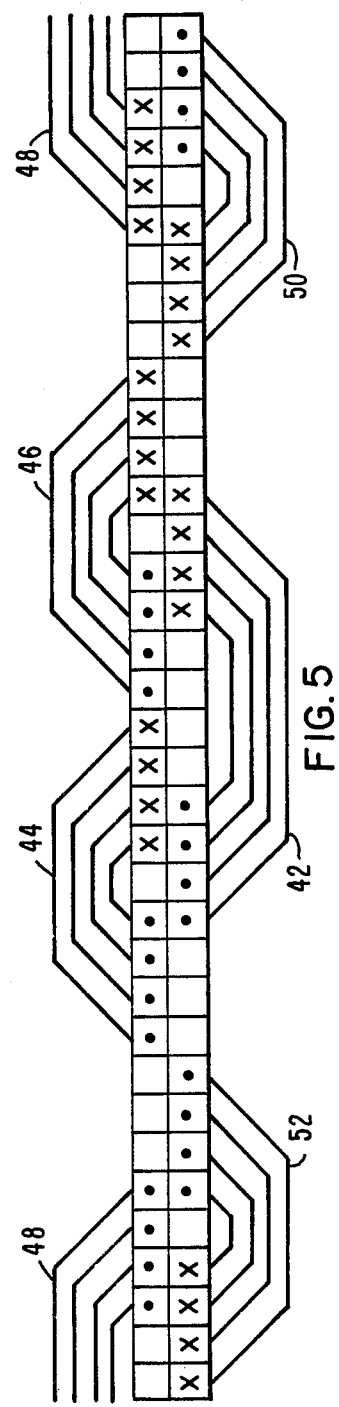
FIG. 5 is a wiring diagram of an auxiliary winding for use with the main stator winding of FIG. 4 and connected in accordance with FIG. 1.

FIG. 5 is a wiring diagram of an auxiliary winding wound in the same manner as the main stator winding of FIG. 4 but displaced to the right by nine slots to achieve a 90° electrical separation along the periphery of the machine on a two pole basis. Although this auxiliary coil is shown to include the same number of windings as the main stator coil, it should be understood that a different number of turns per coil can be used. The auxiliary stator winding of FIG. 5 is connected in accordance with FIG. 1 for two pole operation and if the extreme left hand slot is designated as slot number 1, current flow through this winding will produce a decreasing magnitude zero crossing of the two pole flux between slots 27 and 28. This represents the most desirable relationship between the main and auxiliary windings for a two pole connection. The flux produced by the main stator winding of FIG. 4 is illustrated in waveform 54 of FIG. 6 and has a decreasing magnitude zero crossing between slots 18 and 19. This magnetomotive force distribution includes the fundamental waveform 56 of FIG. 6.

Figure 7:
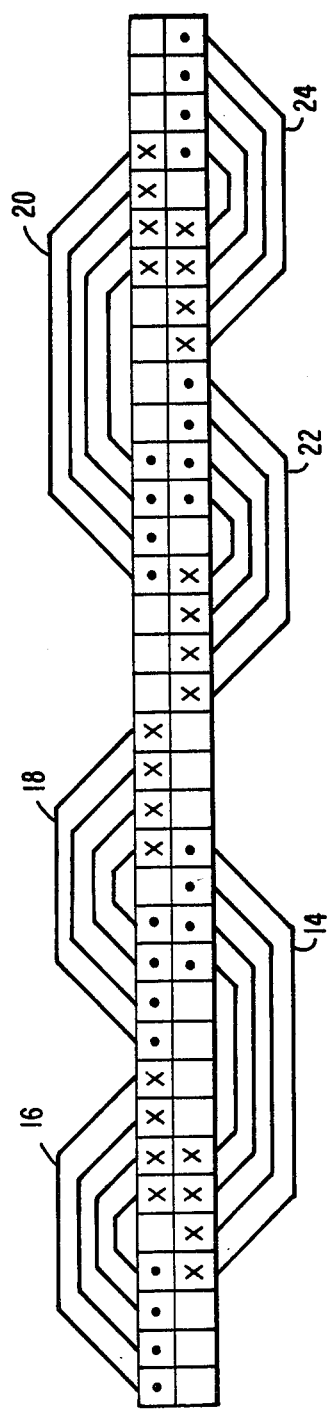
FIG. 7 is a main stator winding wiring diagram showing the slot loading for a 36 slot stator connected in accordance with FIG. 2.
Figure 8:
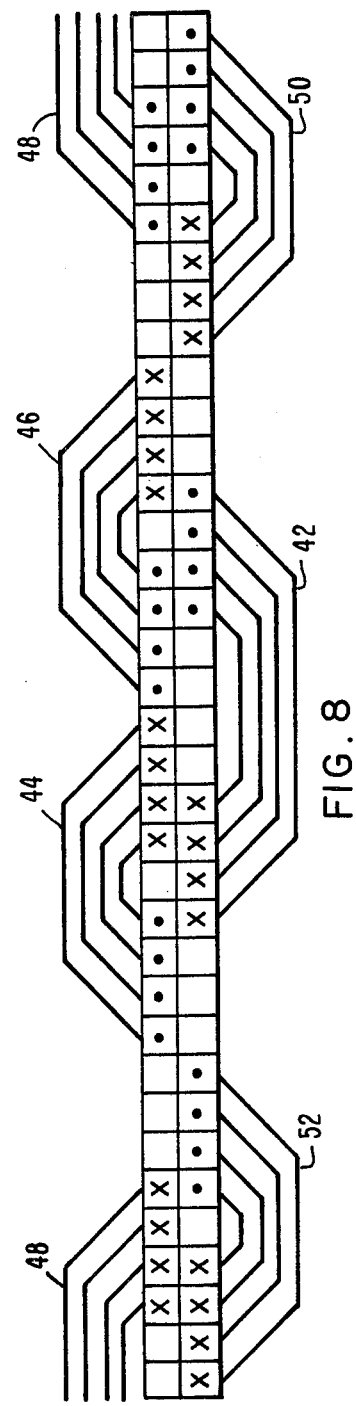
FIG. 8 is a wiring diagram of an auxiliary stator winding for use in combination with the main stator winding of FIG. 7 and connected in accordance with FIG. 2.

FIG. 7 is a wiring diagram of the main stator winding of the motor represented by FIG. 4 wherein the winding coils are connected in accordance with FIG. 2 for a six pole operation. The wiring diagram of FIG. 8 shows the auxiliary winding of FIG. 5 connected in accordance with FIG. 2 for a six pole operation. FIG. 9 shows the magnetomotive force waveform produced by the main stator winding of FIG. 7. In the configuration of FIG. 7, the magnetomotive force distribution 58 of FIG. 9 includes a fundamental 60 which has a decreasing magnitude zero crossing between slots 18 and 19. Because it is a six pole field, decreasing magnitude zero crossings also occur between slots 6 and 7 and between slots 30 and 31. The auxiliary winding connected in accordance with FIG. 8 has a decreasing magnitude zero crossing flux field between slots 27 and 28 as well as between slots 15 and 16 and between slots 3 and 4. Thus the auxiliary winding, when connected for six pole operation, is shifted to the left of the main field by 90 electrical degrees. Under these circumstances, the direction of rotation of the six pole field would be opposite that of the two pole field. If this is undesirable, this feature of motor operation can be changed by modifying the associated control relaying arrangement. It should be understood that an important consequence of this winding arrangement is that only one auxiliary winding is required for both six pole and two pole motor operation. This is in contrast to the two separate auxiliary windings required in a conventional two pole/four pole consequent pole motor.

If one assumed that each coil side element of each coil of FIGS. 4, 5, 7 and 8 has $N_c$ conductors, then the total number of conductors in the periphery of the machine is $48 \times N_c$. The distribution factors for the two pole and six pole configurations have been computed and are 0.4057 and 0.6224 respectively. For constant torque motor operation, the air gap flux densities must be nearly equal for each pole configuration. This can be achieved by providing control relaying which connects the stator winding coils in accordance with the schematic diagrams of FIGS. 1 and 2. Under these circumstances, the ratio of the total winding induced voltage for the two pole numbers becomes equal to unity and the ratio of the flux densities is 0.978. Therefore, the flux density of the six pole field would be approximately 98% of that of the two pole field.

Figure 10:
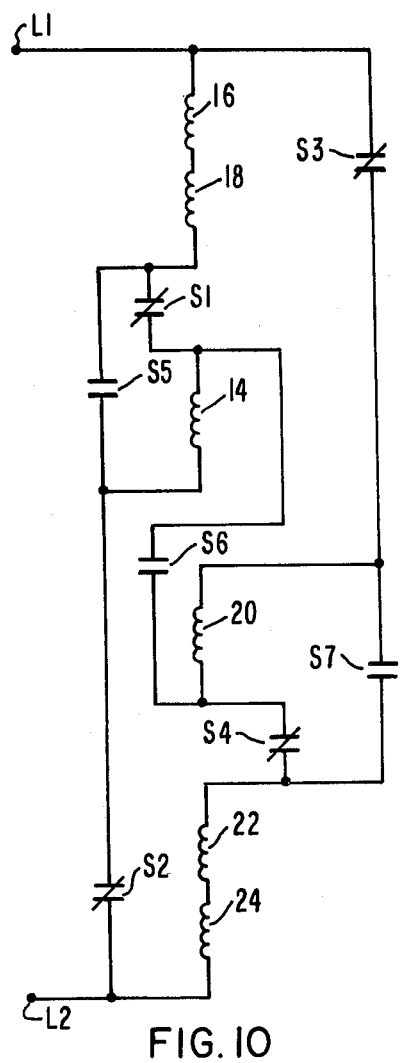
FIG. 10 is a schematic diagram of a main stator winding circuit for a motor system constructed in accordance with one embodiment of this invention.

A schematic diagram of the main stator winding circuit of a motor constructed in accordance with this invention for constant torque operation is shown in FIG. 10. For two pole operation, switches S1, S2, S3 and S4 are closed to form two parallel coil groups which are connected between line terminals L1 and L2. The first coil group includes the series connection of coils 14, 16 and 18 and the second coil group includes the series connection of coils 20, 22 and 24. For six pole operation, switches S5, S6 and S7 are closed while the other switches are opened to connect all of the coils in a single series circuit between line terminals L1 and L2. It should be understood that in the single series circuit arrangement, the polarities of coils 14 and 20 have been reversed. Coils 14 and 20 are type 2 coils which are spaced 180 mechanical degrees apart on the machine periphery with coil 14 being centered between type 1 coils 16 and 18 and coil 20 being centered between type 1 coils 22 and 24.

Figure 11:
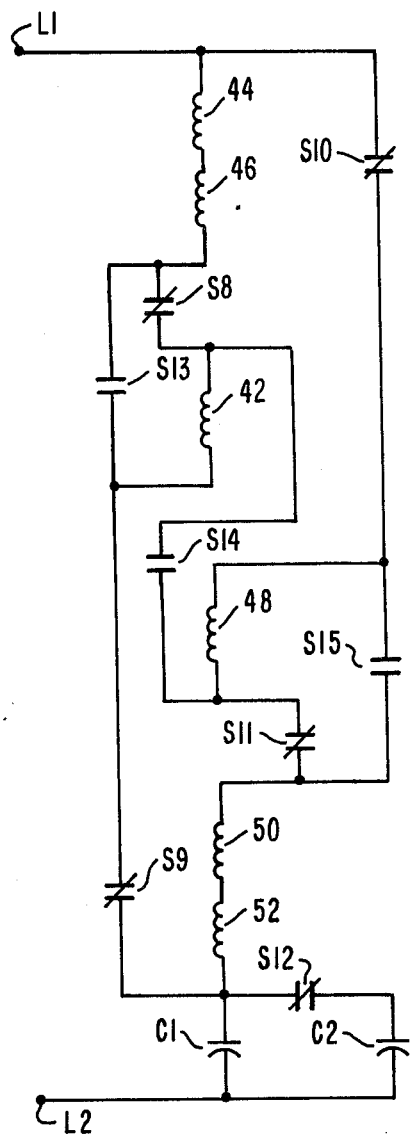
FIG. 11 is a schematic diagram of an auxiliary stator winding circuit for use with the main stator winding of FIG. 10, in accordance with one embodiment of this invention.

FIG. 11 shows the auxiliary stator winding circuit for use in combination with the main stator winding circuit of FIG. 10. In this embodiment, two pole operation is achieved by closing switches S8, S9, S10, S11, and S12 thereby forming two parallel paths of three coils each and connecting these paths in series with the parallel connections of capacitors C1 and C2. For six pole operation, switches S13, S14 and S15 are closed while the other switches are opened to form a single series circuit of all of the coils which is connected in series with capacitor C1 to form a circuit branch which is connected between line terminals L1 and L2. In this configuration, the polarity of coils 42 and 48 is reversed with respect to their connections for two pole operation.

In FIG. 10, it can be seen that there are seven switches or relay contacts necessary to effect the switch-over from two pole to six pole operation. These operations could be achieved by using one four pole double throw relay or two two pole double throw relays. If motor speed will not be changed while the motor is running, the relay contacts of FIG. 10 do not have to make or break current. Their purpose is to provide a setup prior to energizing the motor from a main line contactor, not shown. For the auxiliary winding configuration of FIG. 11, the total switching operation can be accomplished with three double pole, double throw relays or one triple pole relay.

Figure 12:
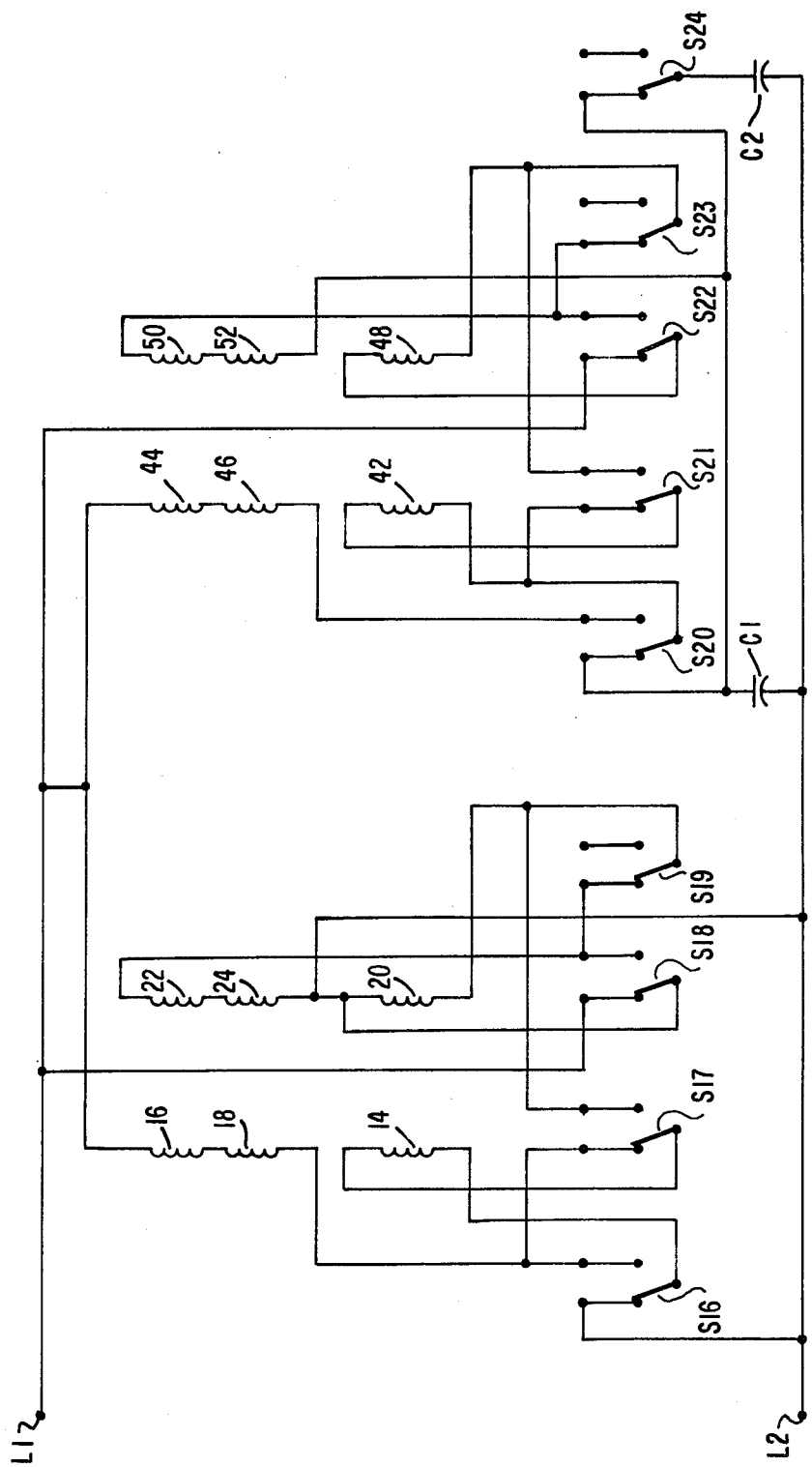
FIG. 12 is an alternative stator winding schematic diagram for a motor constructed in accordance with this invention.

FIG. 12 is a schematic diagram of an alternative stator winding arrangement which accomplishes two pole and six pole motor operation through the use of a single armature nine pole double throw relay. The relay contacts S16 through S24 are shown in position for two pole motor operation wherein the main stator winding includes the parallel connection of two coil groups with one coil group comprising coils 14, 16 and 18 and the other group comprising coils 20, 22 and 24. Similarly, the auxiliary winding is connected to form two parallel auxiliary coil groups with one group comprising coils 42, 44 and 46 and the other group comprising coils 48, 50 and 52. These two auxiliary winding coil groups are connected in parallel and in series with the parallel connection of capacitors C1 and C2 to form an auxiliary circuit which is connected between line terminals L1 and L2. Reversal of all of the relay contacts will place all of the main stator winding coils in series and between line terminals L1 and L2 and all of the auxiliary stator winding coils in series with each other and in series with capacitor C1 and between line terminals L1 and L2.

Although this invention has been described in terms of what is believed to be the preferred embodiment, it will be apparent to those skilled in the art that various changes and modifications may be made without departing from the scope of the invention. For example, the main stator winding coil groups 10 and 12 can be connected in either series or parallel to obtain both two and six pole operation. Table I lists the possible connection configurations.

TABLE I

| | STATOR WINDING CONFIGURATIONS | |
|---|---|---|
| Configuration | Six Pole Group Connections | Two Pole Group Connections |
| 1 | 10 and 12 in series | 10 and 12 in parallel (14 and 20 reversed) |
| 2 | 10 and 12 in series | 10 and 12 in series (14 and 20 reversed) |
| 3 | 10 and 12 in parallel | 10 and 12 in series (14 and 20 reversed) |
| 4 | 10 and 12 in parallel | 10 and 12 in parallel (14 and 20 reversed) |

It should be understood that wherever coils 14 and 20 are shown to be connected for reversed polarity, they could be replaced by coils (16 and 18) and (22 and 24) respectively. This would prevent a reversal of rotation of the machine when switching from six pole to four pole operation. In addition, the main and auxiliary windings need not be wound in a quadrature relationship since an external phase shifting device such as a capacitor could be used.

It is therefore intended that the appended claims cover all such changes and modifications which fall within the scope of this invention.

What is claimed is:
1. An electric motor system comprising:
a pair of line terminals for connection to an external power source;
a first main stator winding coil group connected between said line terminals and including four coils equally spaced around the periphery of the motor and connected such that a first adjoining pair of said four coils produce magnetomotive force of one polarity while the other pair of said four coils produce magnetomotive force of the opposite polarity;
a second main stator winding coil group including two coils spaced 180 mechanical degrees apart wherein one of said second main stator coil group coils is centered between said first adjoining pair of said four coils of said first main stator winding coil group and the other of said second main stator winding coil group coils is centered between said other pair of said four coils of said first main stator winding coil group;
means for connecting said second main stator winding coil group between said line terminals such that the magnetomotive force produced by each coil of said second main stator winding coil group is of the same polarity as the magnetomotive force of the adjacent pair of coils of said first main stator winding coil group, for two pole motor operation; and
means for connecting said second main stator winding coil group between said line terminals such that the magnetomotive force produced by each coil in said second main stator winding coil group is of the opposite polarity as the magnetomotive force of the adjacent pair of coils of said first main stator winding coil group, for six pole motor operation.

2. An electric motor system as recited in claim 1, wherein:
   each of said four coils of said first main stator winding coil group spans 25% of the periphery of the motor; and
   each of said two coils of said second main stator winding coil group spans more than 25% of the periphery of the motor.

3. An electric motor system as recited in claim 1, further comprising:
   a first auxiliary stator winding coil group connected between said line terminals and including four coils equally spaced around the periphery of the motor and connected such that a first adjoining pair of said four coils of said first auxiliary stator winding coil group produce magnetomotive force of one polarity while the other pair of said four coils of said first auxiliary stator winding coil group produce magnetomotive force of the opposite polarity;
   a second auxiliary stator winding coil group including two coils spaced 180 mechanical degrees apart wherein each of said second auxiliary stator winding coil group coils is centered between said first adjoining pair of said four coils of said first auxiliary stator winding coil group and the other of said second auxiliary stator winding coil group is centered between said other pair of said four coils of said first auxiliary stator winding coils group;
   means for connecting said second auxiliary stator winding coil group between said line terminals such that the magnetomotive force produced by each coil of said second auxiliary stator winding coild group is of the same polarity as the magnetomotive force of the adjacent pair of coils of said first auxiliary stator winding coil group, for two pole motor operation; and
   means for connecting said second auxiliary stator winding coil group between said line terminals such that the magnetomotive force produced by each coil in said second auxiliary stator winding coil group is of opposite polarity as the magnetomotive force of the adjacent pair of coils of said first auxiliary stator winding coil group, for six pole motor operation.

4. An electric motor system as recited in claim 3 wherein each of said coils of said first and second auxiliary stator winding coil groups is disposed 90 electrical degrees from a corresponding coil in said first and second main stator winding coil groups, when connected for two pole operation.

5. An electric motor system comprising:
   a pair of line terminals for connection to an external power source;
   a main stator winding including two coil groups each having a plurality of series connected coils;
   means for connecting said coil groups of said main stator winding in a single series circuit between said line terminals for operation at a first speed;
   means for connecting said coil groups of said main stator winding in parallel with each other and between said line terminals, while reversing the polarity of only one coil in each of said groups for operation at a second speed, wherein the coils which are subject to reversed polarity are spaced 180° mechanical degrees apart and the remaining main stator winding coils in each group are symmetrically positioned with respect to the center of the coil in the same group which is subject to reversed polarity;
   an auxiliary stator winding including two coil groups each having a plurality of series connected coils and having the same relative angular displacement as said two coil groups of said main stator winding;
   a first capacitor;
   means for connecting said coil groups of said auxiliary stator winding in a single series circuit with said first capacitor, said single series circuit being connected between said line terminals for operation at said first speed;
   a second capacitor;
   means for connecting said first and second capacitors in parallel; and
   means for connecting said coil groups of said auxiliary stator winding in parallel with each other while reversing the polarity of one coil in each of said auxiliary stator winding coil groups, wherein this parallel connection of auxiliary stator winding coil groups is connected in series with the parallel connection of said first and second capacitors to form a circuit which is connected between said line terminals for operation at said second speed.

6. An electric motor system as recited in claim 5, wherein:
   the number of conductors used to form the coils of said two coils groups is selected to achieve substantially the same air gap magnetic flux density when the motor is operated at said first and said second speeds.

7. An electric motor system comprising:
   a pair of line terminals for connection to an external power source;
   a main stator winding including six coils;
   means for connecting said six coils of said main winding between said line terminals to form six poles for operation at a first speed;
   means for connecting said six coils of said main winding between said line terminals to form two poles, wherein two of said coils have a reversed polarity with respect to their connection for six pole operation, for operation at a second speed;
   an auxiliary stator winding including six coils having the same relative angular displacement as said six coils of said main stator winding;
   a first capacitor;
   means for connecting said six coils of said auxiliary winding to form six poles in a series circuit with said first capacitor, to form a first circuit branch, said first circuit branch being connected between said line terminals for operation at said first speed;
   a second capacitor;
   means for connecting said first and second capacitors in parallel;
   means for connecting said six coils of said auxiliary winding to form two poles in a series circuit with the parallel connection of said first and second capacitors to form a second circuit branch which is connected between said line terminals wherein two of said auxiliary winding coils each have a reversed polarity with respect to their connection in said first circuit branch, for operation at said second speed;

wherein two of said six coils of said main stator winding are spaced 180 mechanical degrees apart; and the other four of said six coils of said main stator winding are spaced 90 mechanical degrees apart and two of these four coils are symmetrical disposed around the center point of each of the two coils which are spaced 180 mechanical degrees apart.

8. An electric motor system as recited in claim 7, wherein:

said two of said six coils of said main stator winding each spans more than 90 mechanical degrees; and said other four of said six coils of said main stator windings each span 45 mechanical degrees.

9. An electric motor system as recited in claim 7, wherein:

said six coils of said main stator winding are connected in series when connected to form six poles; and said six coils of said main stator winding, when connected to form two poles, are connected in two parallel circuits, each having three series connected coils.

10. An electric motor system as recited in claim 9, wherein each of said two parallel circuits, which are formed when said main stator winding coils are connected for two pole operation, includes:

one of said two coils of said main stator winding which are spaced 180 mechanical degrees apart; and the two of said other four main stator winding coils which are symmetrically disposed around the center point of that one coil.

11. An electric motor system comprising:

a pair of line terminals for connection to an external power source;

a main stator winding including six coils;

means for connecting said six coils of said main winding between said line terminals to form six poles for operation at a first speed;

means for connecting said six coils of said main winding between said line terminals to form two poles, wherein two of said coils have a reversed polarity with respect to their connection for six pole operation, for operation at a second speed;

an auxiliary stator winding including six coils having the same relative angular displacement as said six coils of said main stator winding;

a first capacitor;

means for connecting said six coils of said auxiliary winding to form six poles in a series circuit with said first capacitor, to form a first circuit branch, said first circuit branch being connected between said line terminals for operation at said first speed;

a second capacitor;

means for connecting said first and second capacitors in parallel;

means for connecting said six coils of said auxiliary winding to form two poles in a series circuit with the parallel connection of said first and second capacitors to form a second circuit branch which is connected between said line terminals wherein two of said auxiliary winding coils each have a reversed polarity with respect to their connection in said first circuit branch, for operation at said second speed;

wherein two of said six coils of said auxiliary stator winding are spaced 180 mechanical degrees apart; and the other four of said six coils of said auxiliary stator winding are spaced 90 mechanical degrees apart and two of these four coils are symmetrically disposed around the center point of each of the two coils which are spaced 180 mechanical degrees apart.

12. An electric motor system as recited in claim 11, wherein:

said six coils of said auxiliary stator winding are connected in series when connected to form six poles; and said six coils of said auxiliary stator winding, when connected to form two poles, are connected in two parallel circuits, each having three series connected coils.

13. An electric motor system as recited in claim 12, wherein each of said two parallel circuits which are formed by the connection of coils of said auxiliary stator winding, for two pole operation, includes:

one of said two coils of said auxiliary stator winding which are spaced 180 mechanical degrees apart; and the two of said other four auxiliary stator winding coils which are symmetrically disposed around the center point of that one coil.

14. An electric motor system as recited in claim 11, wherein:

said two of said six coils of said auxiliary stator winding each spans more than 90 mechanical degrees; and said other four of said six coils of said auxiliary stator winding each spans 45 mechanical degrees.

* * * * *